(No Model.)
H. F. POORE.
SAW.
No. 428,411. Patented May 20, 1890.
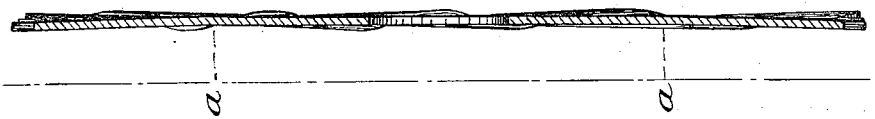
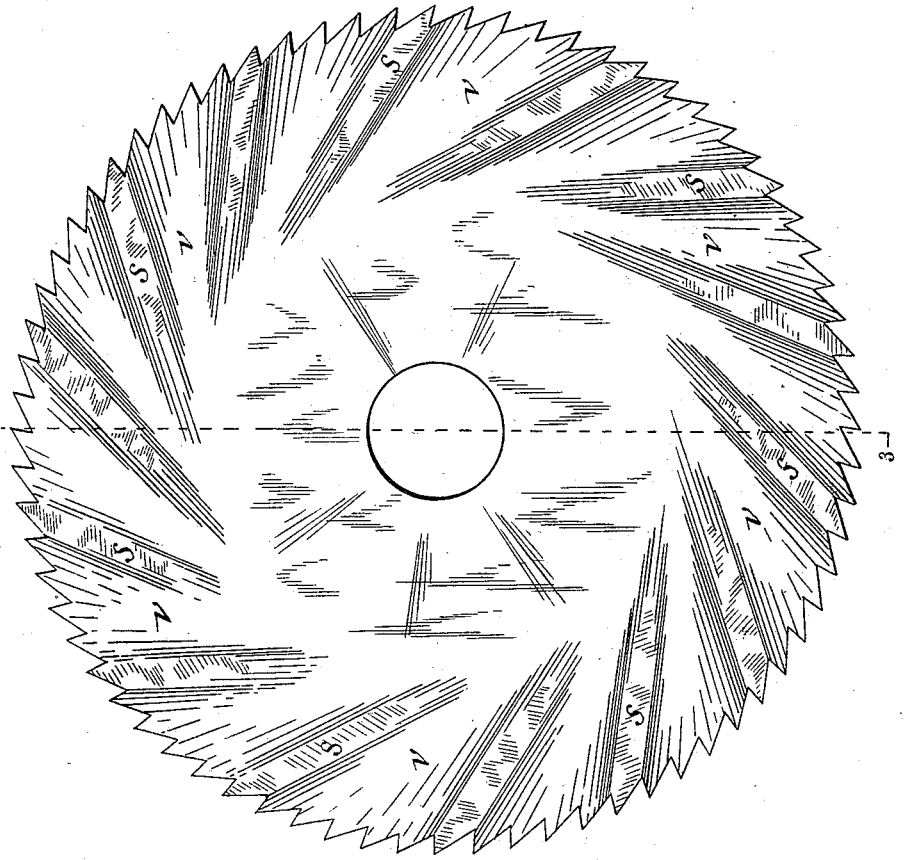
WITNESSES.
H Dean Rhodes
J Walsh
INVENTOR.
Henry F. Poore,
per E. W. Bradford
ATTORNEY.

UNITED STATES PATENT OFFICE.

HENRY F. POORE, OF INDIANAPOLIS, INDIANA.

SAW.

SPECIFICATION forming part of Letters Patent No. 428,411, dated May 20, 1890.

Application filed November 19, 1889. Serial No. 330,904. (No model.)

*To all whom it may concern:*

Be it known that I, HENRY F. POORE, a citizen of the United States, residing at Indianapolis, in the county of Marion and State of Indiana, have invented certain new and useful Improvements in Saws, of which the following is a specification.

My said invention consists, essentially, in the formation of a serpentine edge to the saw, whereby a kerf may be cut somewhat wider than the thickness of the saw-plate.

It further consists in a peculiar formation of the serpentine edge, all as will be hereinafter more particularly described and claimed.

Referring to the accompanying drawings, which are made a part hereof, and on which similar letters of reference indicate similar parts, Figure 1 is a side elevation of a circular saw embodying my invention, Fig. 2 an edge view thereof, and Fig. 3 a central sectional view.

As is well known, saws generally require that the teeth shall be "set" in order that the saw-plate shall not bind in operation in the kerf. It has also been necessary, in order to produce a saw of the required stiffness, that the plate of which it is composed should be of a thickness bearing a certain proportion to the size of the saw. I have discovered that by bending the edge of the saw alternately in opposite directions, thus making it of a serpentine form, the requirements of set are not only obviated, but the plate is also stiffened, thus reducing the labor in preparing the saw for use and rendering it possible to make the saw thinner, lighter, and consequently less expensive.

By an examination of the drawings, particularly Fig. 3, it will be observed that the saw-plate extends out a considerable distance in a plane at right angles to the axis of rotation, (as the whole saw-plate commonly does;) but from this point (such a point as indicated by the intersection of dotted lines at $a$ alongside Fig. 3) out to the periphery of the saw the plate is alternately bent each way and stands at an angle to this plane, which, as hereinbefore stated, gives the edge of the saw a serpentine formation and takes the place of the ordinary setting of the teeth.

I prefer and have shown in the drawings a bending of the saw on tangential lines, which are, as near as can be calculated, just that departure from radial lines sufficient to compensate for the cutting backward of the teeth as the saw is worn away, thus keeping the relation of the teeth and these bends in the saw-plate the same at all times.

As is well known to those skilled in the art, saws after being formed and tempered are usually ground over the entire surface, giving them a smooth polished character, which presents the least frictional resistance in doing their work. In my improved saw this grinding of the whole surface is not necessary; but it is desirable, in order that the projection of the bent-out portions from the general plane of the saw shall be absolutely uniform, that the extremities of said bent-out portions shall be ground somewhat, and this I prefer to do. This is illustrated in Fig. 1 by showing the sides $s$ of the bent-out portions as flattened. The valleys $v$ between these bent-out portions are the bent-out portions of the other side of the saw and are similarly flattened.

I am aware that saws have been produced the edges of which were bent or distorted from their natural position in various ways; but I am not aware that any saw has been produced in which the edge has been bent into a regular serpentine form, or in which the bends extended from the edge part way toward the center and at an angle to the plane at right angles with the axis of rotation occupied by the central portion of the saw.

The word "edge" where used in the specification and in the claims means the outer portion of the body of the saw. In the drawings this bent-out edge is shown as extending into the point indicated by the intersection of the dotted lines alongside Fig. 3. While I do not confine myself to this exact point, I regard the illustration as showing a proper and desirable amount of bending.

Having thus fully described my said invention, what I claim as new, and desire to secure by Letters Patent, is—

1. A circular saw the edge of which is bent alternately in opposite directions, the bends starting from a point in the body of the saw and gradually increasing as they approach the extreme edge, substantially as set forth.

2. A circular saw the edge whereof is bent alternately in opposite directions, the bent-out portions standing at an angle to the plane which is at right angles with the axis of rotation occupied by the central portion of the body of the saw.

3. A circular saw having its edge bent alternately in opposite directions, the bends being made on tangential lines, substantially as shown and described.

4. A circular saw the central portion of the body of which stands in a plane at right angles with the axis of rotation and the edge whereof is bent out alternately in each direction at an angle with said plane on tangential lines.

5. A circular saw having its edge bent alternately in each direction into a serpentine form, the bends being on tangential lines corresponding to the direction that the teeth are worn or filed away in use, substantially as set forth.

6. A circular saw the edge of which is bent alternately in opposite directions, the extreme outer surfaces of the bent-out portions being ground, whereby an accurately-uniform projection is secured, substantially as set forth.

In witness whereof I have hereunto set my hand and seal, at Indianapolis, Indiana, this 14th day of November, A. D. 1889.

HENRY F. POORE. [L. S.]

Witnesses:
C. BRADFORD,
E. C. ATKINS.